COMMUNICATION SYSTEM

Filed Jan. 18, 1966 4 Sheets-Sheet 1

TRANSMITTED DATA PULSES

RECEIVED DATA PULSES

RESHAPED DATA PULSES

INVENTOR.
William P. Foster
BY
James J. Jennings, Jr.
Attorney (Input Logic Circuit)

(Control Logic Circuit)

INVENTOR.
William P. Foster
BY James J. Jennings Jr.
Attorney

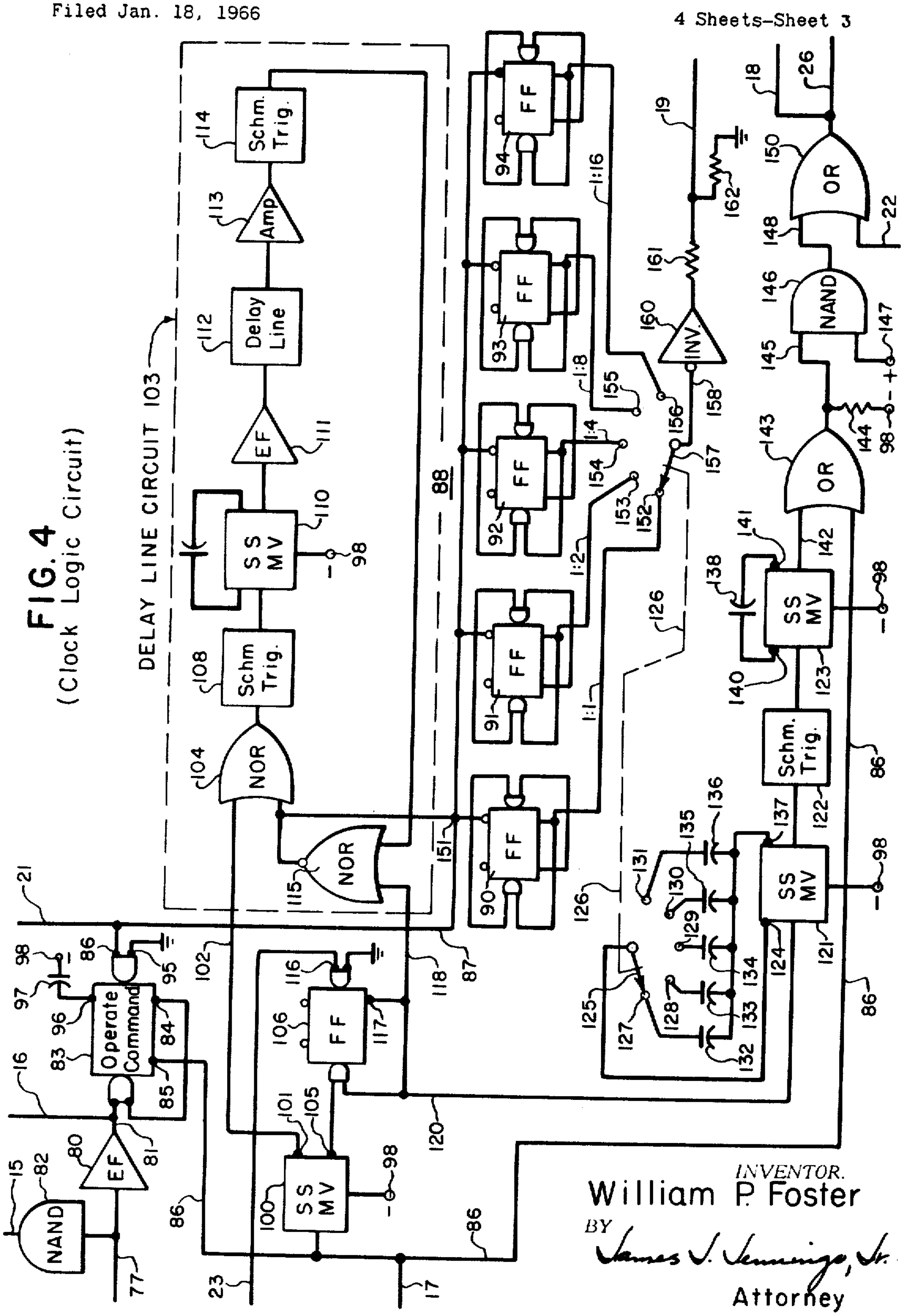
FIG. 4 (Clock Logic Circuit)
INVENTOR.
William P. Foster
BY James J. Jennings, Jr.
Attorney COMMUNICATION SYSTEM
Filed Jan. 18, 1966 4 Sheets-Sheet 4
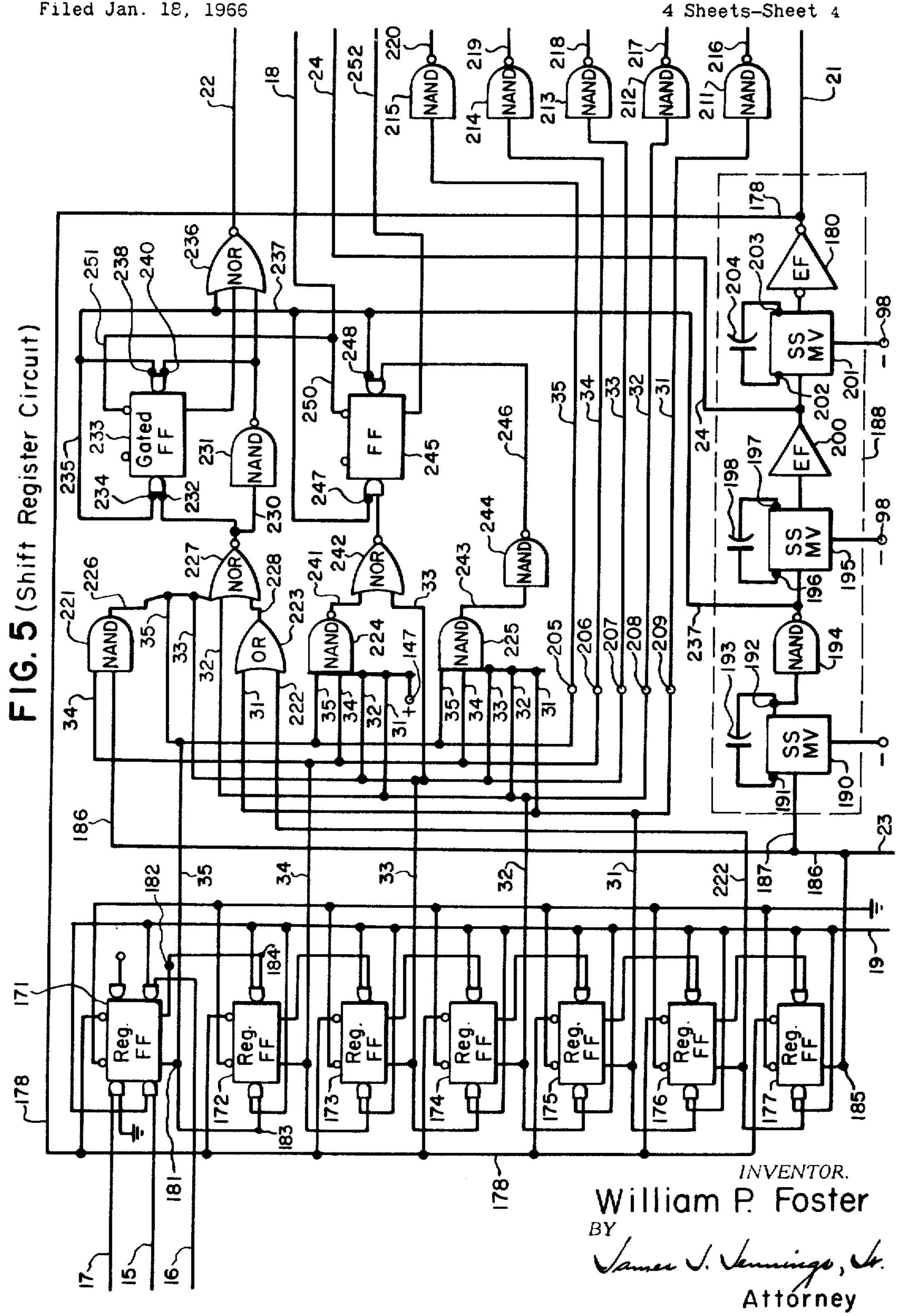
FIG. 5 (Shift Register Circuit)
INVENTOR.
William P. Foster
BY
James J. Jennings, Jr.
Attorney United States Patent Office 3,389,381

Patented June 18, 1968

3,389,381

COMMUNICATION SYSTEM

William P. Foster, Paoli, Pa., assignor to Borg-Warner Corporation, Chicago, Ill., a corporation of Illinois Filed Jan. 18, 1966, Ser. No. 521,352

10 Claims. (Cl. 340—172.5)

The present invention is directed to a system for effecting the accurate detection and synchronization of electrical signals denoting information in a binary digital system to enable the precise reproduction of such information as originally constituted, and more particularly to such a system which effects the requisite synchronization of the received binary information signals without requiring a precision timing apparatus or clocks at both the transmitting and receiving stations and further effects the reproduction of the received binary information at high speeds.

In the course of transmission of digital data information, the data pulse train is generally subjected to amplitude and delay distortion effects which both limit the data transmission rate and increase the possibility of error in the detected and reproduced data. It is therefore a prime requisite that information-denoting pulses be recovered in, or be reconstituted to, substantially the same form as that in which they are transmitted, so that the correct information may be obtained.

A further requirement of digital data information systems is the synchronization of the incoming data pulse train by means of an electronic clock. The clock or precision oscillator unit of a digital data information system determines the speed at which the system operates, since it is effectively a data pulse coordinator that controls the timing of the data pulses. In high speed digital data information systems an electronic clock is usually provided at both the transmitting and receiving stations. Generally such communication systems require the provision of either crystal clock oscillators or sophisticated multivibrator circuits at each end to achieve the precise starting time required for synchronization. It is highly desirable to provide a reliable and efficient electronic clock and yet eliminate the complex circuit provisions now required.

An important object of this invention is the synchronization of incoming binary digital information without requiring an electronic clock at both the transmitting and receiving ends of the system.

It is another object of this invention to record binary digital information at a high speed without requiring an electronic clock at both the transmitting and receiving stations of the system.

It is a further object of this invention to recover the true binary digital information sent at the transmitting station of the system, even though the signal is subjected to a high degree of distortion and attenuation.

The foregoing and other objects of the invention are realized in a system for synchronizing the receipt and distribution of data pulses received in serial format in groups of pulses wherein each pulse group denotes a specific character. The system likewise synchronizes the read-out of the data pulses in a parallel format. In a preferred embodiment the invention comprises clock circuit means which operates upon receipt of the first pulse in each pulse group to provide a train of precisely spaced clock pulses. In the system of the invention a novel precision timing circuit is provided which includes a delay line and the initial clock pulse is delayed, amplified, and recirculated to provide a train of timing pulses for coordinating movement of the data pulses in one group through the system. A shift register circuit has a plurality of memory circuits connected to receive the data pulses in serial format at the first of these memory circuits. The clock pulses are applied simultaneously to all of the memory circuits, stepping the sequential data pulses through the memory circuits to provide a group of character-denoting signals simultaneously on the respective output conductors of the memory circuits, thus achieving the parallel format. Means is also provided in the shift register for operation when the last pulse of the group is stored in a memory element to provide a stop pulse for the clock circuit which both terminates the train of clock pulses just generated, and conditions the clock circuit to commence production of another train of clock pulses upon receipt of the first pulse in the next successive group of character-denoting data pulses.

To enable those skilled in the art to make and use the invention, the best mode contemplated for carrying out the invention will be set forth in connection with the accompanying drawings, in the several figures of which like reference numerals identify like elements, and in which:

FIGURE 1 is a block diagram depicting the system of the invention;

FIGURES 2A, 2B, and 2C are waveforms useful in understanding the operation of the invention;

FIGURE 4 is a block diagram illustrating in more detail the clock logic circuit shown generally in FIGURE 1;

FIGURE 5 is a block diagram illustrating in more detail the shift register circuit shown generally in FIGURE 1.

Figure 1:
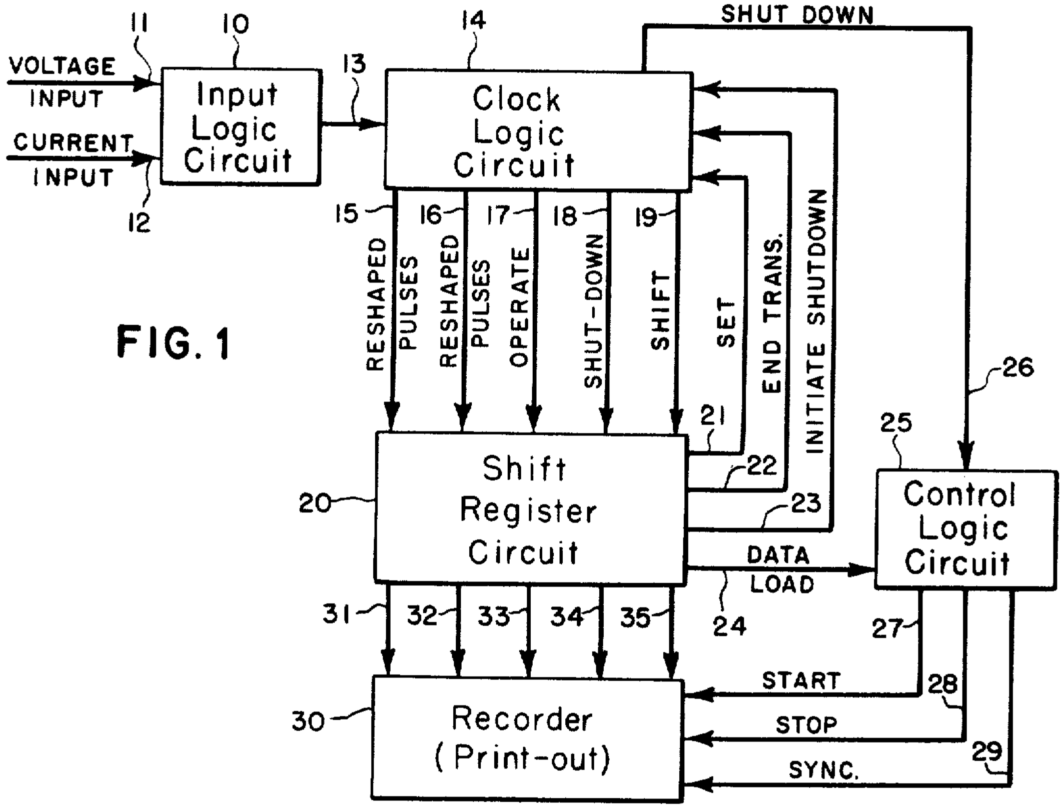

In describing the invention by setting forth the structure and operation of the preferred embodiment illustrated in the drawings, specific terminology is used for the sake of clarity. However, it is understood that each specific term includes all technical equivalents which operate in a similar manner to accomplish a similar purpose.

GENERAL SYSTEM ARRANGEMENT

Turning now to the preferred embodiment of the invention illustrated in FIGURE 1, input logic circuit 10 can receive the distorted data pulses (FIG. 2B) either over voltage input line 11 or current input line 12. Circuit 10 prepares the distorted input signal for acccurate signal recovery in the clock logic circuit 14 by reshaping the distorted input signal, as shown in FIGURE 2C. The reshaped data pulses are then applied over line 13 to clock logic circuit 14. The clock logic circuit 14 is a regenerative circuit which provides accurate timing or clock pulses for synchronization and further effects the accurate signal recovery of the distorted input data pulses. The reshaped data pulses and various control signals are passed from clock logic circuit 14 over conductors 15–19 to shift register circuit 20. The shift register circuit 20 converts the serial data pulse train to parallel format and performs other important functions to be hereinafter described. Control signals provided by shift register circuit 20 are passed over lines 21–23 to clock logic circuit 14, and over line 24 to a control logic circuit 25. Control logic circuit 25, which provides the stop-start timing signals for all modes of system operation, receives signals over line 26 from clock logic circuit 14, and passes control signals over lines 27–29 to recorder 30. Recorder 30 prints the information signified by data signals received over conductors 31–35 from shift register circuit 20 under the regulation of the control signals received over lines 27–29.

Figure 2A:
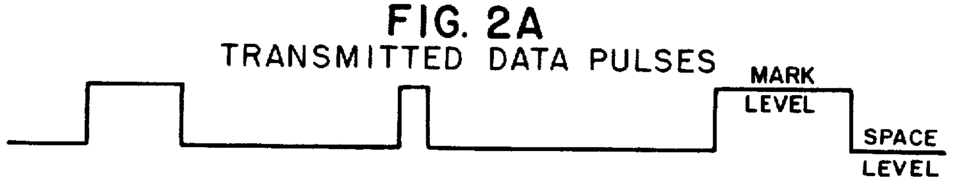
Figure 2B:
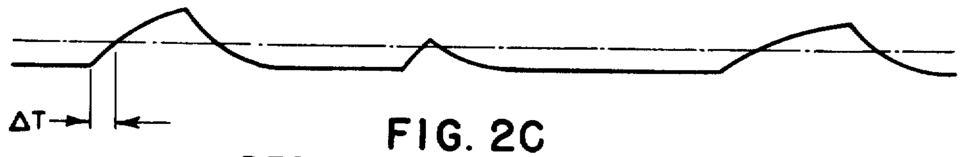
Figure 2C:
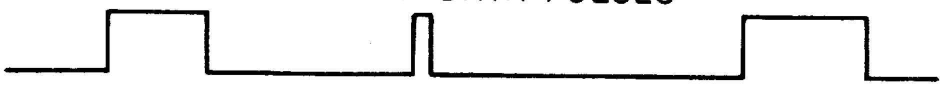

FIGURES 2A–2C illustrate the effect of amplitude and delay distortion during the course of the transmission, reception and reproduction of a train of digital data information pulses. FIGURE 2A represents a source signal having transitions at exact multiples of some preset clock time, FIGURE 2B shows the degradation in the received signal manifested in variable amplitudes, rise times, and fall times. FIGURE 2C depicts the reshaped wave train as produced by the input logic circuit, which will be presented to the clock logic circuit 14 for accurate recovery of the original information as transmitted.

SYSTEM CIRCUITS

*Input logic circuit 10*

Figure 3:
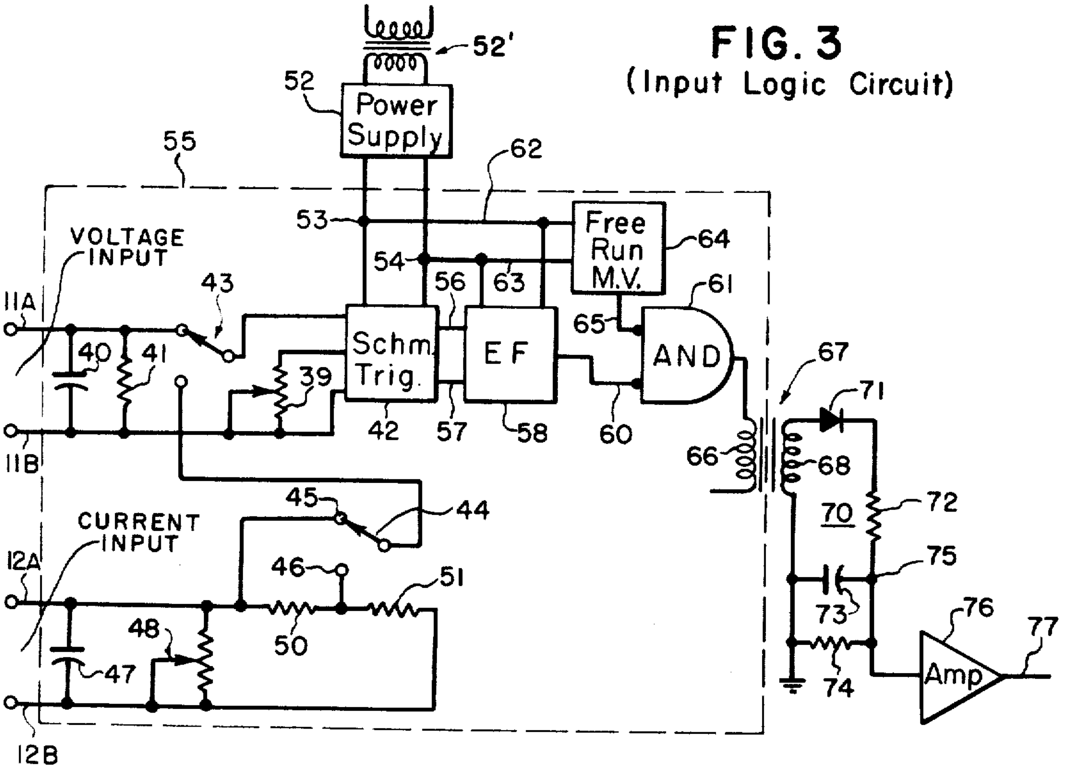
FIGURE 3 is a block diagram, partly in schematic form, illustrating in more detail the input logic circuit shown generally in FIGURE 1.

As shown in FIGURE 3, input logic circuit 10 can receive the distorted data pulses over conductors 11A, 11B of the voltage input circuit or conductors 12A, 12B of the current input circuit. A capacitor 40 and a resistor 41 are coupled in parallel between conductors 11A and 11B to establish an input impedance level for Schmitt trigger stage 42. Coupled to the input side of stage 42 is an input switch 43 which is operable to select either voltage or current input. A contact of switch 43 is coupled to another switch 44 which is operable to select either of two preselected values of current sensitivity when current input is chosen. A low sensitivity is obtained when contact 45 is engaged, and a higher sensitivity is achieved when terminal 46 is engaged. The low sensitivity input "sees" capacitor 47 in parallel with both variable resistor 48 and resistors 50, 51. The high sensitivity input circuit extends in part from terminal 46 to the common connection between resistors 50 and 51.

Isolated power supply 52 provides, at terminals 53 and 54, the supply potential required by that part of the input logic circuit designated by numeral 55. Schmitt trigger 42 is a low hysteresis circuit which dips and passes only the positive-going portions of the distorted signal shown in FIGURE 2B. From the output side of Schmitt trigger stage 42 the signal passes over conductors 56, 57 to emitter follower (EF) stage 58 which shapes the signal into a rectangular wave having a minimum of amplitude distortion. The output side of emitter follower 58 is coupled over one conductor 60 to one input terminal of AND circuit 61, and EF 58 is also coupled over conductors 62, 63 to a free-running multivibrator 64, which in turn is coupled over conductor 65 to the other input of AND circuit 61. The signal passed from EF 58 over conductors 62, 63 modulates the output signal from free-running multivibrator 64. The modulated signal is then applied to primary winding 66 of transformer 67, which includes a secondary winding 68 coupled to detector circuit 70. The detector circuit includes a diode 71 coupled in series with a resistor 72, and the parallel-connected combination of capacitor 73 and resistor 74 connected between terminal 75 and ground. The signal at terminal 75 is coupled to the input side of amplifier 76. The output signal of amplifier 76 on conductor 77 is the reshaped data pulse train depicted in FIG. 2C.

*Clock logic circuit 14*

The clock logic circuit shown in FIGURE 4 receives the reshaped data pulses over line 77 from input logic circuit 10. A first stage emitter follower 80 acts as an isolation stage between input conductor 77 and output conductor 81. The reshaped data pulses received over conductor 77 are also fed into the input of Nand gate 82, and the output data pulses are applied from stage 82 over conductor 15 to shift register circuit 20 (FIG. 5), and over conductors 81, 16 to the shift register circuit. Operate command complimenting flip-flop 83 has its clock input connection coupled to conductor 81, and has its gate input connected to terminal 84, while output terminal 85 provides the operate command signal over conductor 86, and further over conductor 17 to the shift register circuit 20. Terminal 86 receives a set pulse over conductor 21 from the shift register circuit 20, and terminal 86 is also coupled over conductor 87 to the rate divider circuit 88, which includes flip-flops 90–94. Terminal 95 is connected to ground. Terminal 96 is connected to the positive side of a capacitor 97, and the other plate of this capacitor is coupled to terminal 98, to which a negative operating potential is applied.

Single shot multivibrator stage 100 has its input coupled to conductor 86, and this stage is biased through terminal 98. Output terminal 101 is coupled over conductor 102 to one input connection of delay line circuit 103 at Nor gate 104, while output terminal 105 of stage 100 is coupled to and sets the clock input of flip-flop 106.

In accordance with the present invention, clock logic circuit 14 contains a sonic delay line circuit 103, which comprises Nor gate 104, a Schmitt trigger 108, a single shot multivibrator 110, an emitter follower 111, a delay line 112, an amplifier 113, a Schmitt trigger 114, and a Nor gate 115. Flip-flop 106 is also reset at clock gate terminal 116, and when this occurs gate 115 is shut off by the connection between terminal 117 over conductor 118 to the input of gate 115. The terminal 117 is also intercoupled to the gate input of stage 106, and over conductor 120 to the input terminal of a single shot multivibrator stage 121, which provides a 3 bit delay. The output side of stage 121 is coupled to the input terminal of a Schmitt trigger 122 whose output circuit is in turn coupled to the input terminal of a second single shot 123. Terminal 124 of single shot 121 is connected to movable contact 125 of switch 126. Contact 125 is movable to engage any of fixed contacts 127–131, thus to place a corresponding one of capacitors 132–136 in the circuit between terminals 124 and 137. The setting of switch 126 is made in relation to the selected transmission rate.

Capacitor 138 is connected to both terminals 140 and 141 of single shot multivibrator 123. Both single shots 121 and 123 are connected to the negative supply potential terminal 98. The output side of single shot 123 is coupled over conductor 142 to one input terminal of OR gate 143, and the operate signal is extended over conductor 86 to the other input of gate 143. Thus as long as a character follows the pulse is inhibited. A resistor 144 is coupled between negative supply terminal 98 and conductor 145, which extends between the output of OR gate 143 and one input of inverter Nand gate 146. The other input terminal of Nand gate 146 is connected to positive supply potential 147. The output of inverter 146 is coupled over conductor 148 to one input of OR gate 150, while the other input of gate 150 is connected to receive an end-of-transmission pulse over conductor 22 from shift register circuit 20. Gate 150 sends out a shut down pulse from its output terminal when the operate signal is not received.

The clock logic circuit also contains a connection from the output terminal of NOR gate 115 which allows pulses to pass over terminal 151 into the clock divider circuit composed of flip-flops 90–94. One terminal of each flip-flop is coupled over conductor 87 to "set" conductor 21, and the output of each flip-flop in the divider circuit is selectively coupled to one of fixed contacts 152–156 for engagement by movable contact 157 of switch 126 as this switch is adjusted to effect a frequency division for the given transmission rate. Movable contact 157 is coupled over conductor 158 to inverter 160. A resistor 161 is coupled between the output terminal of inverter 160 and conductor 19, over which shift pulses are applied to shift register circuit 20 to move incoming data along the shift register as described below. A resistor 162 is connected between conductor 19 and ground.

*Shift register circuit 20*

The shift register circuit shown in FIGURE 5 receives serial data bit by bit over conductors 15, 16 at the upper left portion of the register circuit, receives an operate pulse over conductor 17, and receives shift pulses over conductor 19 (lower left of circuit). The shift pulses step the data bits down the register to provide a parallel format at the output connections of the upper five register stages 171–175. For reading 5 characters the register is composed of seven register stages 171–177, each register stage being a gated flip-flop. First register stage 171 receives serial data over conductors 15, 16. All of the flip-flop stages 171–177 have one terminal connected to line 19 over which shift pulses are applied to each register to move the data down the register for parallel format. A conductor 178 is also coupled to each of flip-flop stages 171–177; a set signal from the output side of emitter follower 180 is applied over conductor 178 to set each register stage to the zero state for another serial train of data. Also the output terminals 183 and 184 of stage 172, and the output terminals of each successive flip-flop in the register are similarly connected to the input terminals of the next flip-flop. The output of terminal 185 at the last flip-flop 177 in the register is coupled over conductor 23 to terminal 116 of flip-flop 106, and serves to initiate the shutdown of the clock gate. The output signal at terminal 185 is also applied over conductors 186, 187 to regulate generation of a series of readout and reset pulses in circuit 188. This circuit comprises an input single shot multivibrator 190 whose terminals 191, 192 are shunted by a capacitor 193. a Nand gate 194, a single shot 195 whose terminals 196, 197 are shunted by a capacitor 198, an emitter follower 200, a single shot 201 whose terminals 202, 203 are shunted by a capacitor 204, and the emitter follower 180.

Parallel output signals from registers 171–175 are available at terminals 205–209. To be compatible with the other logic, the register output signals on conductors 31–35 are inverted in Nand gate stages 211–215, respectively by selectively coupling conductors 31–35 to the input terminal of each gate 211–215. The output signals of the set register then appear on conductors 216–220 as inverted relative to the signals on conductors 31–35. In addition, parallel data output signals from the register are decoded to recognize two sequential carriage-return signals as an end-of-transmission signal. The output signals on conductors 34 and 186 are connected to the input terminals of Nand gate 221, while output signals from conductors 31 and 222 are applied to the input terminals of OR gate 223. The signals on conductors 35, 34, 32 and 31 are applied to the input terminals of Nand gate 224 as shown. The signals on conductors 35–31 are applied to the input terminals of Nand gate 225 as shown.

The output signal of Nand gate 221 is passed over conductor 226, and together with the output signals on conductors 35, 33 and 32 is applied to the upper input terminals of NOR gate 227 The output signal from OR stage 223 is applied over conductor 228 to the lower input terminal of Nor gate 227. The decoded data from the output of Nor gate 227 is applied over conductor 230 to the input of Nand gate 231, and over conductor 232 to the input terminal of gated flip-flop 233. Terminal 234 of flip-flop 233 is coupled over conductor 235 to an input terminal of Nor gate 236, over conductors 235, 237 to the output side of Nand gae 194, and to terminal 238 of flip-flop 233. Terminal 240 of flip-flop 233 is coupled to the output circuit of Nand gate 231, and also to an input terminal of Nor gate 236. The remaining output of flip-flop 233 is coupled to the other input terminal of Nor gate 236. The output signal of Nor gate 236 is applied over conductor 22 to clock logic circuit 14 for use as an end-of-transmission pulse in the clock logic circuit as an alternate shut down signal.

In another decoding circuit, the output of Nand gate 224 is applied over conductor 241 to an input terminal of Nor gate 242, while the signal on conductor 33 is applied to the other input terminal of Nor gate 242. The output signal of Nand gate 225 is applied over conductor 243 to the input of Nand gate 244. The output signal of Nor gate 242 denotes a figure shift character, and such output signal is applied to an input terminal of flip-flop stage 245. The output signal of Nand gate 244 denotes a letter shift character, and such output signal is applied over conductor 246 to an input of flip-flop 245. Terminals 247, 248 of flip-flop 245 are coupled over conductor 237 to the terminals 234, 238 of flip-flop 233. The shut down pulse received over conductor 18 from clock logic circuit 14 is passed over conductors 250, 251. A sixth bit output, which may be used with the 5 data bits as the parallel output of the register circuit, is supplied by stage 245 over conductor 252. A data load pulse is provided at the output side of emitter follower 200 and passed over conductor 24 to control logic circuit 25, wherein the pulse is used as an input to control logic circuit 25.

*Control logic circuit 25*

Figure 6:
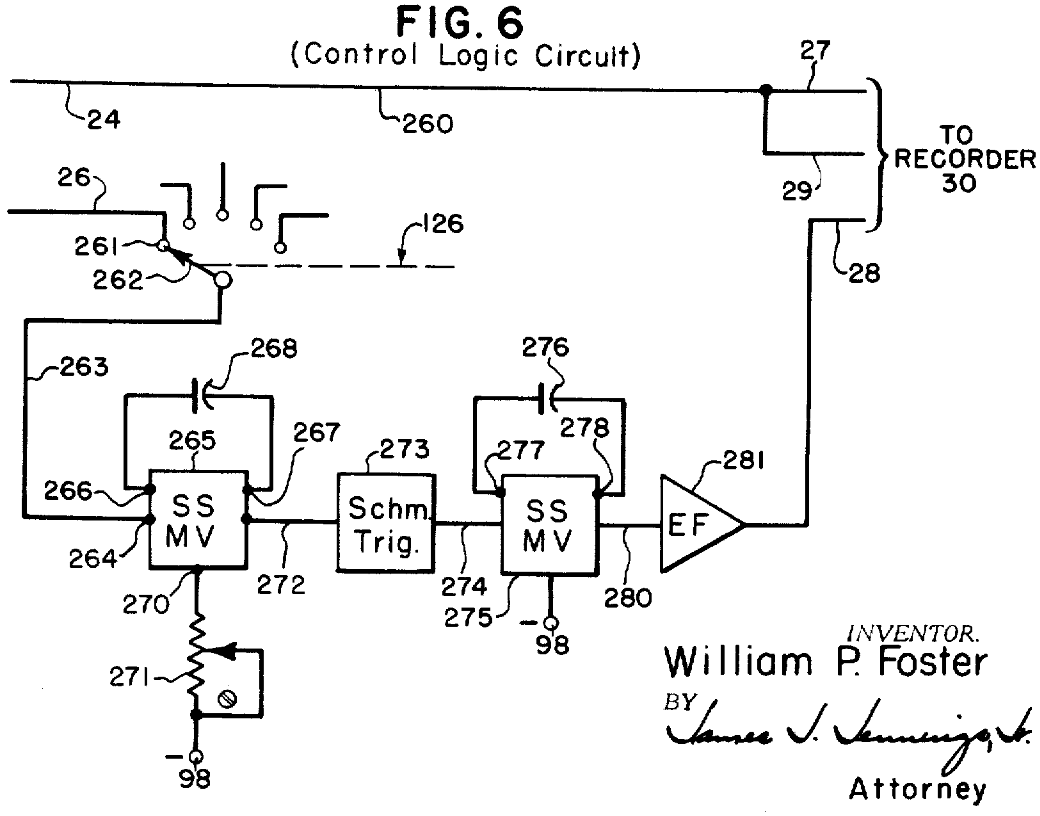
FIGURE 6 is a block diagram illustrating in more detail the control logic circuit shown generally in FIGURE 1.

The control logic circuit shown in FIGURE 6 provides the stop-start timing in all modes of operation, with serial or parallel data input. The data load pulse received over conductor 24 from shift register circuit 20 is routed over conductor 260 directly to conductors 27 and 29, to provide the start and sync pulses for regulating recorder 30. The shut down pulse received over conductor 26 is passed over contacts 261, 262 of another contact bank of the rate selection switch and over conductor 263 to terminal 264 of a single shot multivibrator 265. A capacitor 268 is coupled across terminals 266, 267 of stage 265. Terminal 270 of this stage is connected to one side of a potentiometer 271, with the other side of the potentiometer being coupled to negative supply terminal 98. The output signal from stage 265 is coupled over conductor 272 to the input of Schmitt trigger stage 273, and the output side of the Schmitt trigger is coupled over conductor 274 to the input side of single shot 275. Capacitor 276 is coupled across terminals 277, 278 of stage 275, and the output signal from this stage is applied over conductor 280 to the input side of emitter follower 281. A stop tape output signal is provided at the output side of emitter follower 281 and passed over conductor 28 to recorder 30.

SYSTEM OPERATION

In operation, either voltage or current input is selected by actuation of switch 43 (FIGURE 3) and, if current input is selected, the sensitivity is adjusted by switch 44. Assuming voltage input is selected, the input signal is applied to Schmitt trigger 42, and input voltage threshold control 39 allows the trigger point of Schmitt trigger 42 to be set at a low predetermined value, minimizing distortion caused by level changes. The output signal from stage 32 is passed through emitter follower 58, providing a rectangular wave having a minimum of amplitude distortion. This reshaped signal, shown in FIGURE 2C, has been delayed by a time $\Delta$ T from that of the original pulse train shown in FIGURE 2A. This reshaped pulse train modulates the output of free running multivibrator 64, which is operating at a substantially higher frequency. The modulated output signal is coupled over transformer 67 and pulse shaping circuit 70, whose output is restandardized in inverter 76. The output signal of inverter 76 is a train of reshaped data pulses (FIGURE 2C) which is passed over conductor 77 to the clock logic circuit 14.

It is important to note that the entire input circuit ahead of transformer 67, including the power supply 52, is isolated from ground, resulting in substantial noise immunity and the ability to ground any one of the input terminals.

At the first mark to space transition, operate flip-flop 83 in the clock logic circuit (FIGURE 4) is set so as to provide an operate command output signal over conductors 86 and 17. The reshaped data pulses received over conductor 77 passes through emitter follower 80 and into complimenting flip-flop 83. The output signal from terminal 85 of flip-flop 83 is applied to single shot stage 100 and causes this single shot to generate a single pulse of short duration, which pulse is gated over conductor 102 into NOR gate 104 of the sonic delay line 103. The single pulse passes through gate 104, Schmitt trigger 108, single shot 110, emitter follower 111, delay line 112, amplifier 113 and Schmitt trigger 114 to gate 115. The inverted output of single shot 100 also sets the clock gate flip-flop 106, which opens the recirculating gate 115 in the delay line circuit 103, allowing a train of clock pulses to be generated at a rate which is a function of the reciprocal of the time delay of delay line 112, and the train of pulses is delayed one pulse time. Clock gate flip-flop 106 also allows the clock pulses to pass into the clock pulse divider circuit 88 comprised of flip-flops 90–94. The clock pulses are counted in clock divider circuit 88 to form a train of shift pulses having a precise rate and starting exactly half an interval after the above-mentioned mark to space transition. The shift pulses are inverted in logic driver 160 and passed over conductor 19 to the shift register circuit (FIGURE 5) to move incoming data pulses through the memory stages in the shift register as will be described below.

Reshaped data pulses from clock logic circuit 14 are passed over conductors 15, 16 to the upper left of shift register 20. At the same time the train of shift pulses is received over conductor 19 and applied simultaneously to all the memory stages 171–177 to step the data bits down the memory stages so that after receipt of six shift pulses the data character is presented in parallel format on the output conductors 35–31 of the upper five register memory stages 171–175.

At the transition from mark frame to space frame between each group of character-denoting pulses the operate signal is generated as described previously and applied over conductor 17 to set a mark in the first memory stage 171 of the shift register circuit. The data pulse signals on conductors 15 and 16 are at space after the transition. At the center of the bit interval a shift pulse is received over conductor 19, loading the space bit into memory stage 171 and shifting the mark bit from stage 171 into memory stage 172. In a like manner, each incoming data bit pulse is loaded into the first register memory stage 171 and previously received bit pulses are shifted one step down the register. At the sixth shift instant the first mark is shifted into the last register stage 177. Stage 177 passes an ouput signal over conductors 185, 23 to terminal 116 of flip-flop 106 in the clock logic circuit 14, where the output signal resets the clock gate 115 and terminates the train of shift pulses by halting generation of the clock pulses. The output signal from stage 177 is also utilized to initiate generation of a series of readout and reset pulses.

More specifically, the output pulse is applied over conductors 185, 186 and 187 to single shot multivibrator stage 190. When the pulse is applied to single shot 190, this stage generates a pulse which is passed through NAND stage 194 and used for strobing decoded control characters, the pulse being applied over conductor 237 to flip-flops 233 and 245. The pulse from stage 194 is also applied to single shot 195 to generate a data load pulse which is passed through emitter follower 200 and over conductor 24 to control logic circuit 25. The output signal from stage 200 is also applied to single shot 201 to generate a set register pulse which is passed through emitter follower 180 and over conductor 178 to reset all register memory stages 171–177. The same set pulse is applied over conductor 21 to the operate command flip-flop 83 and clock pulse divider circuit 88 (both in FIGURE 4) to reset these stages at the end of each group of character-denoting pulses in time to be ready for the mark-space transition at the beginning of the next pulse group. Each reset operation on stage 83 also triggers single shot 100 to reset flip-flop 106 and provide a signal over conductor 120 to trigger stage 121. Single shot 121 provides a three bit delay before passing a signal through Schmitt trigger 122 and gating a second single shot 123. This stage thus provides a short pulse, three bits after the last pulse of a character pulse group is received, which short pulse is gated with the operate signal into the input terminals of OR gate 143, so that as long as another character-denoting pulse group is received to provide another operate signal over conductor 86 to OR gate 143, the output of stage 143 is inhibited. When no successive group of character pulses follow, the operate signal is not received over conductor 86 and the delayed pulse is passed through stages 143, 146 and 150 to apply shut down pulses over conductors 18 and 26 to shut down the system. Inverter 146 permits compatibility with the OR gate 150 which allows an alternate shut-down signal (end of transmission pulse over conductor 22) from the shift register.

Parallel data output pulses from the shift register (FIGURE 5) are decoded to recognize two sequential carriage return characters as an end-of-transmission signal. Input signals to stages 221, 223 and 227 are decoded to recognize a carriage return signal which sets flip-flop 233. Stage 233 is reset if the next character received is not a carriage return signal. When a second carriage return signal follows the first, stage 236 provides an end-of-transmission pulse on output conductor 22 at the same instant the character strobe pulse is applied over conductor 237. The flip-flop 233 is reset by application of the shut-down pulse over conductors 18 and 251 to stage 233. The end-of-transmission pulse is passed over conductor 22 for use in the clock logic circuit as an alternate shut-down signal.

Letter and figure shift character groups are recognized by gates 224, 242, 225 and 244. The sixth bit flip-flop 245 is set by receipt of a figure shift pulse group at the instant a character strobe pulse is received over conductor 237. The flip-flop 200 may also be reset over conductor 246 by the letter shift signal at the character strobe pulse time. Reset also occurs at shut-down.

The transmission rate for the system is selected by switch 126, as shown in FIGURES 4 and 6. The clock divider circuit 88 is connected to provide rate division in powers of two, giving a choice of five rates as shown in the preferred embodiment. In each case the rise time of the shift pulse output signal passed over conductor 19 is timed to coincide with the center of each input bit interval when the input clock matches the delay line and where no delay distortion is present.

With the data pulses stored in the memory stages 171–177 of the shift register and ready for passage to recorder or printer 30, control logic circuit 25 provides the stop-start timing signal in the various modes of operation. At stepping speeds all control pulses are timed from the data load pulse received over conductor 24. Print spacing is obtained by single shot stage 265. Delay time adjustment is effected by adjusting potentiometer 271, and the sync pulse is passed over conductor 29 to recorder 30 to strobe data into the recorder. At the end of transmission a stop pulse passed over conductor 28 shuts off recorder 30.

SUMMARY

The present invention effects the accurate reproduction of distorted data pulse signals and provides a visible record of the information at a very high speed. A significant contribution is the utilization of a recirculating delay line circuit which automatically generates the clock pulses for application to the appropriate portions of the complete system when information-denoting pulses are ready to be routed through the system, and the delay line circuit is shut off after the data pulses have been stored in the buffer memory stages. Accurate reproduction of the binary digital information has been achieved notwithstanding substantial distortions, both with respect to the amplitude and time delays, of the transmitted data signals. By utilizing known recorders for print out, the recovered information can be reproduced with the code marks on one portion of the record, and alphanumeric characters adjacent the code marks to provide a visible record readable by humans and by machines. Versatility is incorporated by providing a simple control to rapidly adjust the equipment for receiving code signals, such as the five bit Baudot code, at rates of 150, 300, 600, 1200 and 2400 bits/second. Accurate operation even at these last two rates, with signals greatly distorted, and with high speed print out of the reshaped data pulses has been attained with the system of this invention.

While only a particular embodiment of the invention has been described and illustrated, it is apparent that modifications and alterations may be made therein. It is therefore the intention in the appended claims to cover all such modifications and alternations as may fall within the true spirit and scope of the invention.

I claim:

1. A system for synchronizing the receipt and distribution of data pulses received in serial format in groups of pulses, each pulse group denoting a character, and the conversion of the data pulses into a parallel format, comprising:

clock circuit means operative responsive to receipt of the first pulse in each group to provide a train of precisely-spaced clock pulses, and shift register means, including a plurality of memory circuits connected to receive the data pulses in serial format at one of said memory circuits and having a plurality of output conductors respectively coupled to the different memory circuits to present the data pulses in parallel format, means for applying said train of clock pulses simultaneously to all of said memory circuits to step the serial data pulses sequentially through the memory circuits and provide a group of character-denoting signals simultaneously on said output conductors, and means operative upon storage of the last pulse of a character-denoting group to pass a stop pulse to said clock circuit means to terminate the train of clock pulses.

2. A system as claimed in claim 1 in which said clock circuit means includes a delay line circuit having a closed loop arrangement and operative, upon receipt of said first pulse in each group, to generate a single pulse which is delayed, amplified, and recirculated through said closed loop to provide said train of precisely-spaced clock pulses for stepping the data pulses through said memory circuits.

3. A system as claimed in claim 2 and further comprising a rate divider circuit, coupled between said delay line circuit and said shift register means, including switch means for selecting the frequency at which the clock pulses received from the clock circuit means will be applied as shift pulses to the memory circuits in said shift register means, thereby to correlate the movement of the data pulses through the shift register means in accordance with the rate at which the data pulses are received in the system.

4. A system as claimed in claim 2 and including an input logic circuit, connected to the input of the system to receive the incoming data pulses in serial format and to reshape the received data pulses and prepare said received data pulses for accurate signal recovery.

5. A system as claimed in claim 4 in which said input logic circuit comprises voltage input connections and current input connections for receiving the data pulses, a power supply for energizing the input portion of said input logic circuit, and means for isolating both said input circuit portion and said power supply from ground, thereby providing substantial noise immunity and enabling any one of said input connections to be grounded.

6. A system for receiving groups of data pulses in serial format, each pulse group denoting a character, said pulses being subject to amplitude and delay distortion, and for regulating the translation of said pulses from serial format to parallel format, comprising:

an input logic circuit having input connections for receiving the data pulses in serial format, and circuit means for reshaping said data pulses;

a clock circuit, connected to receive the reshaped data pulses from said input logic circuit, having means operative responsive to receipt of the first pulse in each group to generate a train of precisely-spaced clock pulses to be utilized as shift pulses; and a shift register circuit including a plurality of memory stages each having an output conductor, means for applying said data pulses in serial format to one of said memory stages, means for applying said shift pulses simultaneously to all of said memory stages to step each serial group of data pulses sequentially through the memory stages to provide simultaneous signals on said output conductors, thus effecting the translation from serial to parallel format, and means operative responsive to storage of the last pulse of a group in the shift register circuit to provide a stop pulse and apply the stop pulse to said clock circuit, to terminate the train of clock pulses.

7. A system as defined in claim 6 and in which said clock circuit comprises a delay line circuit having input and output conductors and which operates, responsive to receipt over the input conductor of said first pulse in each data pulse group, to generate a single pulse which is delayed, amplified and recirculated in the delay line circuit to provide on said output conductor a number of clock pulses related to the number of recirculations through the delay line circuit, said recirculation being terminated responsive to receipt of said stop pulse from the shift register circuit.

8. A system as claimed in claim 7 and further comprising a rate divider circuit coupled to said output conductor of the clock circuit, including switch means operable to select a frequency division rate of said clock pulses to provide shift pulses for stepping the data pulses through the successive memory stages in the shift register at a rate corresponding to the rate at which information data pulses are received at the input logic circuit.

9. A system as claimed in claim 8 and further comprising means, coupled in the circuit for producing said stop pulse and connected for actuation concomitantly with the rate selection switch means, for regulating the production of the stop pulse in accordance with the rate at which information is received at the input logic circuit.

10. A system as claimed in claim 7 and further comprising a recorder connected to receive the data signals in parallel format from said shift register circuit, and a control logic circuit, connected to receive date load signals from said shift register circuit and to receive shut down signals from said clock circuit, and for passing start, sync and stop signals to said recorder to regulate the operation of the recorder in the print out of characters signified by the parallel data pulse signals received from the shift register circuit.

References Cited

UNITED STATES PATENTS

| | | | |
|---|---|---|---|
| 3,245,040 | 4/1966 | Burdett et al. | 340—172.5 |
| 3,249,922 | 5/1966 | Mero | 340—172.5 |

ROBERT C. BAILEY, *Primary Examiner.*

R. B. ZACHE, *Assistant Examiner.*